United States Patent Office 2,845,477
Patented July 29, 1958

2,845,477

MOUNTING MEANS FOR A BUSHING

Ralph R. Kelley, Sharpsville, Pa., and Fred B. Colby, Hubbard, Ohio, assignors to Westinghouse Electric Corporation, East Pittsburgh, Pa., a corporation of Pennsylvania Application December 20, 1952, Serial No. 327,098

2 Claims. (Cl. 174—163)

This invention relates to insulating bushings and their mounting or support members and particularly to means for assembling a bushing in its support member so as to obtain an effective seal between the support member and the bushing.

Heretofore the installation of bushings on a transformer case generally necessitated the use of a number of auxiliary components; such as, projection welded studs on the case wall or cover, nuts, lock washers, steel or cast iron bushings, cushion washers and special bosses formed on the bushings themselves to accommodate the gaskets required to secure a pressure tight and weather proof seal. These prior art assemblies are necessarily bulky, are difficult to inspect for leaks and improper assemblies, and have many inaccessible areas that can not be properly painted and therefore rust out before the transformer has reached its normal life expectancy.

An object of this invention is to provide for obtaining an effective seal between a bushing and a mounting member, by so disposing a coupling member simulating a sleeve with respect to the bushing and the mounting member and around a gasket, that pressure is applied to the gasket to form it to such a shape that high pressure is exerted through the gasket to the desired sealing joints between the bushing and the mounting member.

Another object of this invention is to provide an interlock between a coupling member and a mounting member so that an effective seal is maintained between the mounting member and a bushing, by providing the mounting member and the coupling member of predetermined shape so that an interlock is formed therebetween when a gasket is disposed under pressure between the coupling member and the bushing.

Other objects of this invention will become apparent from the following description when taken in conjunction with the accompanying drawing in which.

Figure 1:
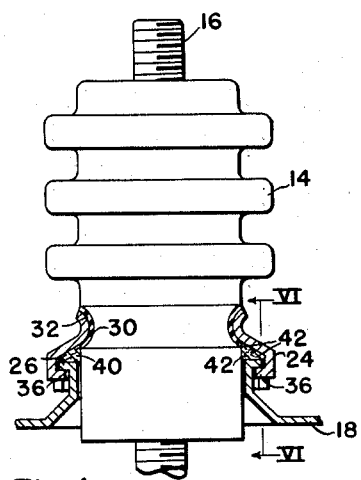
Figure 1 is an elevational view, partly in section, of the bushing mounting apparatus embodying the teachings of this invention.
Figure 2:
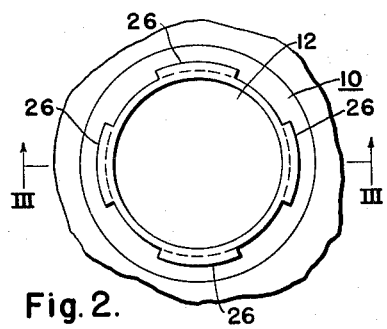
Fig. 2 is a plan view of the mounting member illustrated in Fig. 1.
Figure 3:
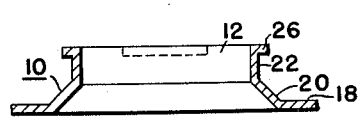
Fig. 3 is a view in section of the mounting member illustrated in Fig. 2 taken along the line III—III.

Referring now to the drawing and in particular to Figs. 1, 2 and 3, there is illustrated a metallic mounting member shown generally at 10 having a substantially circular opening 12 for receiving a porcelain electrical insulating bushing 14 having a conductor rod 16 extending therethrough, the conductor rod 16 being connected to the bushing 14 in a conventional manner. As illustrated, the mounting member 10 extends outwardly from a case 18 which has disposed therein electrical equipment (not shown). In this instance, the mounting member 10 comprises a conical shaped section 20 and a cylindrical section 22.

In order to provide an engaging surface for a metallic coupling member 24 simulating a sleeve, the upper portion of the cylindrical section 22 of the mounting member 10 is provided with a plurality of outwardly extending flange projections 26. The manner in which the mounting member 10 and the coupling member 24 cooperate will be described in greater detail hereinafter.

Figure 4:
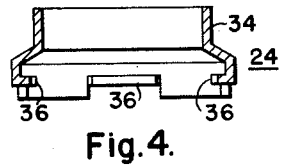
Fig. 4 is a view in section of the coupling member illustrated in Fig. 1 before it is applied to the bushing illustrated in Fig. 1.

For the purpose of connecting the coupling member 24 to the bushing 14 to thereby obtain a rigid and tight joint between the bushing 14 and the coupling member 24, an annular groove 30 is provided around the bushing 14. A layer of resilient material 32 such as rubber is then disposed in the groove 30. As can be seen in Fig. 4 the coupling member 24 in its original form is constructed with a band or collar portion 34. The collar portion 34 is positioned around the resilient material 32, after which the band or collar 34 is spun or rolled so as to conform to the groove 30 of the bushing 14. This rolling or spinning of the metal causes the resilient material 32 to also conform to the groove 30 and thus seal the space between the coupling member 24 and the bottom of the groove 30 of the bushing 14, whereby a substantially rigid and fluid tight joint is obtained between the coupling member 24 and the bushing 14, the resilient layer of material 32 enabling the bushing 14 and the coupling member 24 to physically respond to changes in temperature without impairing the joint therebetween.

Figure 5:
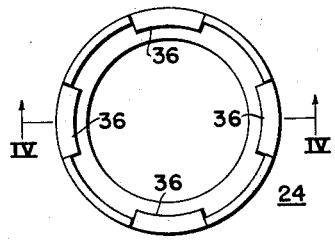
Fig. 5 is a bottom plan view of the coupling member illustrated in Fig. 4.

Referring more particularly to the coupling member 24, the lower portion of the coupling member 24 is provided with a plurality of inwardly extending lugs 36. The location of the lugs 36 can more clearly be seen in Figs. 4 and 5 in which the coupling member 24 is shown in its original form before applying it to the bushing 14. In practice, the lugs 36 are preferably formed by cutting a plurality of slots in the lower portion of the coupling member 24 as it appears in its original form in Figs. 4 and 5, and then bending alternate portions of the metal between the slots inwardly to form the lugs 36. However, the lugs 36 can also be provided by pressing or forming them into the position illustrated in Figs. 1, 4 and 5.

In practice, the apparatus illustrated in Fig. 1 is assembled by first so disposing a compressible gasket 40, which in its original form has a circular or rectangular cross-section, around the bushing 14 that the gasket 40 in its original form is disposed between the coupling member 24 and the bushing 14. The gasket 40, which is preferably made of a suitable gasket material that readily assumes an irregular shape when pressure is applied to it, can either be suitably cemented in its original form between the bushing 14 and the coupling member 24 or it can be disposed in this position without the application of cement. The assembly comprising the bushing 14, the gasket 40 in its original form, and the coupling member 24, is then positioned with respect to the mounting member 10 by applying pressure to the assembly by means of, for instance, a suitable tool (not shown), to cause the lugs 36 of the coupling member 24 to pass through the openings between the flange projections 26 on the mounting member 10 and thereby distort the gasket 40 from its original shape to the shape illustrated in Fig. 1. It is to be noted that if cement is applied to the gasket 40 when in its original shape or form, the gasket 40 should be distorted to the shape illustrated in Fig. 1 before the cement has a chance to set.

Once the lugs 36 of the coupling member 24 have passed through the openings between the flange projections 26 of the mounting member 10, the coupling member 24 is either rotated clockwise or counterclockwise until the lugs 36 of the coupling member 24 are in alignment with their complementary flange projections 26 of the mounting member 10. When the lugs 36 of the coupling member 24 and the flange projections 26 of the mounting member 10 are so positioned and the gasket 40 is distorted or compressed to the shape illustrated in Fig. 1, high pressure is exerted through the gasket 40 to the sealing joints 42 between the bushing 14 and the mounting member 10 to thereby obtain an effective seal between the bushing 14 and the mounting member 10 which seal prevents moisture or gas from entering the case 18 containing electrical equipment (not shown). The reason that high pressure is exerted through the gasket 40 to the sealing joints 42 between the bushing 14 and the mounting member 10 is that the gasket 40 is so distorted under pressure between the bushing 14, the mounting member 10, and the coupling member 24, that the gasket 40 has a very small cross-sectional area at the sealing joints 42.

Figure 6:
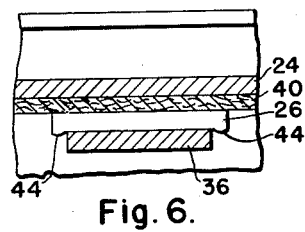
Fig. 6 is an enlarged fragmentary view taken along the line VI—VI of Fig. 1.

In order to provide an interlock between the coupling member 24 and the mounting member 10, each of the flange projections 26 of the mounting member 10 is provided with spaced depending locking extensions 44 which can more clearly be seen in Fig. 6. Thus once the lugs 36 of the coupling member 24 are passed through the openings between the flange projections 26 of the mounting member 10 and rotated into alignment with their complementary flange projections 26, the lugs 36 are there held in locked position. In practice, it may only be necessary to provide one of the flange projections 26 with spaced depending locking extensions 44.

The apparatus embodying the teachings of this invention has several advantages. For instance, the apparatus for obtaining an effective seal between the bushing 14 and the mounting member 10 is of simple construction. Further, the assembly comprising the bushing 14 and the coupling member 24 can be easily removed from the mounting member 10. In addition, if it is necessary to replace the gasket 40, a new gasket can be quickly substituted.

Since various changes may be made in the foregoing invention without departing from the spirit and scope of the present invention, it is to be understood that the subject matter set forth hereinbefore shall be interpreted as illustrative and not in a limiting sense.

We claim as our invention:

1. In combination with a substantially cylindrical electrical insulating bushing having an annular groove therein, a mounting member extending outwardly from a case and having an opening therein of substantially circular configuration, the electrical insulating bushing being disposed within said opening, the mounting member having a plurality of spaced outwardly extending flange projections, a one-piece coupling member simulating a sleeve disposed around the electrical insulating bushing, one end of the one-piece coupling member extending into the annular groove cooperative to form a substantially rigid connection with the electrical insulating bushing and thus provide a substantially fluid-tight joint between the one-piece coupling member and the electrical insulating bushing, and the other end of the one-piece coupling member being spaced from the electrical insulating bushing and having a plurality of inwardly extending lugs adapted to pass through the spaces between the plurality of spaced outwardly extending flange projections and be rotated into interlocking engagement with said flange projections, a compressible gasket disposed around the electrical insulating bushing and in the space between the electrical insulating bushing and the one-piece coupling member, the compressible gasket being of such size that with the inwardly extending lugs of the one-piece coupling member in interlocking engagement with the said flange projections of the mounting member, said gasket is compressed, whereby pressure is exerted in all directions through the said gasket to thus hold the one-piece coupling member in assembled relationship with respect to the mounting member and provide an effective seal between the mounting member and the electrical insulating bushing.

2. In combination with a substantially cylindrical electrical insulating bushing having an annular groove therein, a mounting member extending outwardly from a case and having an opening therein of substantially circular configuration, the electrical insulating bushing being disposed within said opening, the mounting member having a plurality of spaced outwardly extending flange projections, at least one of which has a depending locking extension on each end of the flange projection, a one-piece coupling member simulating a sleeve disposed around the electrical insulating bushing, one end of the one-piece coupling member extending into the annular groove cooperative to form a substantially rigid connection with the electrical insulating bushing and thus provide a substantially fluid-tight joint between the one-piece coupling member and the electrical insulating bushing, and the other end of the one-piece coupling member being spaced from the electrical insulating bushing and having a plurality of inwardly extending lugs adapted to pass through the spaces between the plurality of spaced outwardly extending flange projections and be rotated into interlocking engagement with said flange projections, a compressible gasket disposed around the electrical insulating bushing and in the space between the electrical insulating bushing and the one-piece coupling member, the compressible gasket being of such size that with the inwardly extending lugs of the one-piece coupling member in interlocking engagement with the said flange projections of the mounting member and with one of said lugs disposed between said depending locking extensions, said gasket is compressed, whereby pressure is exerted in all directions through the said gasket to thus hold the one-piece coupling member in assembled relationship with respect to the mounting member and provide an effective seal between the mounting member and the electrical insulating bushing.

References Cited in the file of this patent
UNITED STATES PATENTS

| | | |
|---|---|---|
| 557,645 | Blessing | Apr. 7, 1896 |
| 1,220,873 | Meyers | Mar. 27, 1917 |
| 1,309,830 | Wanamaker | July 15, 1919 |
| 1,683,156 | Brown | Sept. 4, 1928 |
| 1,988,151 | Austin | Jan. 15, 1935 |
| 2,014,441 | Matthews | Sept. 17, 1935 |
| 2,264,816 | Treanor | Dec. 2, 1941 |
| 2,280,032 | Brandt | Apr. 14, 1942 |